UNITED STATES PATENT OFFICE.

LE ROY BAKER, OF ST. LOUIS, MISSOURI, ASSIGNOR OF ONE-HALF TO ALEXANDER A. EBERSON, OF ST. LOUIS, MISSOURI.

PROCESS OF MAKING BARIUM SULFITE.

967,488. Specification of Letters Patent. Patented Aug. 16, 1910.

No Drawing. Application filed May 17, 1909. Serial No. 496,453.

*To all whom it may concern:*

Be it known that I, LE ROY BAKER, a citizen of the United States, and resident of St. Louis, Missouri, have invented certain new and useful Improvements in Processes of Making Barium Sulfite, of which the following is a specification containing a full, clear, and exact description.

My invention relates to a process of making barium sulfite, to be used as a pigment in the manufacture of paints, enamels, linoleum, oil cloth, window shades, glazed paper, cardboard, and for like purposes, to which it is particularly adapted by its white, inert, non-poisonous character. While somewhat similar in appearance and chemical composition to the artificial barium sulfate or blanc fixe, it differs from it in having much greater staining power for oils when precipitated from hot solutions and consequently better body and covering power in its use as a paint or coating, and thus more nearly resembling the standard white paint pigments, lead and zinc. The chief value of barium sulfite over barium sulfate or blanc fixe is its staining power for linseed oil. When precipitated from cold solution, this staining power is lacking. In other words, it makes a yellow paste with the oil; whereas barium sulfite precipitated hot makes a pure white paste with oil. Furthermore, when precipitated cold, there seems to be an irregularity of the size of the particles, whereas barium sulfite precipitated hot shows under a high power microscope a mass of translucent crystals of uniform size and grain. Blanc fixe precipitated under the same conditions as to heat shows similar crystal forms, except that they are transparent. By my process it can also be produced at less cost than blanc fixe, as the latter requires for its manufacture about one-half a ton of 60° sulfuric acid or its equivalent, at a cost of not less than ten dollars ($10.00) per ton, for each ton of blanc fixe produced; and in the manufacture of blanc fixe it is difficult to wash out the last traces of acid, which, if remaining in the finished product, ruins, or greatly impairs the durability of, any paint or enamel in which it may be used.

Barium sulfite has been experimented on by several men, but the high cost of a pure article and the presence of injurious impurities, *e. g.*, sulfur when made on a commercial scale, has prevented its coming into practical use as a paint pigment. Unless made with some regard to its physical character, it has no more opacity or staining power than blanc fixe. If precipitated from concentrated solutions, it is compact in character and difficult to "break down" (make a smooth paste) with oil. My process was designed to overcome all these difficulties, and the barium sulfite produced by it blends with oil as readily as white lead, which is the standard for painters. Blanc fixe always retains a slightly granular appearance when ground with oil.

In carrying out my process, I roast a mixture of crude barite or heavy spar with 25% of its weight of coal, in a reduction furnace, until the blue flame of carbon monoxid is no longer seen. The reaction which takes place being:

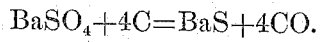
$$BaSO_4 + 4C = BaS + 4CO.$$

During this process, the carbon monoxid generated burns with a blue flame, according to the reaction:

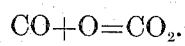
$$CO + O = CO_2.$$

The disappearance of this blue flame marks the end of the reduction process.

The barium sulfid produced by this process is placed in a tank provided with a filter bottom, water is added and boiled vigorously to dissolve the barium sulfid. This solution is then filtered into another tank also provided with a filter bottom and allowed to cool. In the presence of water, barium sulfid is decomposed into barium hydrate and barium sulfhydrate, which are much more soluble in hot water than in cold, consequently on cooling about 80% of the barium salts crystallize out. The mother liquor is then pumped back to the first tank and heated to boiling to dissolve a fresh quantity of barium sulfid. A solution of magnesium chlorid is then run into the tank containing the barium hydrate and sulfhydrate, the quantity of magnesium chlorid present in solution being slightly in excess of the calculated amount necessary to react with the barium hydrate and sulfhydrate, according to the following reaction:

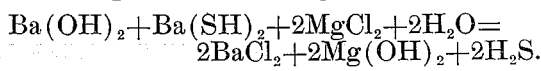

During this reaction, a cover is applied to the tank and the contents boiled vigorously until all the sulfureted hydrogen present is evolved. This sulfureted hydrogen is drawn from the tank by a vacuum pump or jet, burned to sulfur dioxid, washed and conducted back to the tank containing the barium chlorid and magnesium oxid after all sulfureted hydrogen has been expelled, any deficiency in sulfur dioxid being made up by burning the requisite amount of sulfur or pyrite. The sulfur dioxid, on being admitted to the tank containing the barium chlorid and magnesium oxid, combines with the latter to form a magnesium sulfite which immediately reacts with the barium chlorid to form barium sulfite and magnesium chlorid. During this step the solution is kept at or near the boiling point to produce the most favorable results. The reactions taking place are:

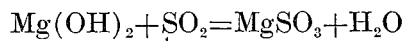
and
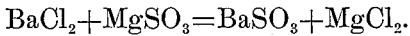

The magnesium chlorid is drawn off through the filter bottom, sufficient wash water added to displace the solution adhering to the precipitated barium sulfite, and the solution of magnesium chlorid and the wash water pumped or conveyed back to a solution tank for use again. If any free sulfur is present, formed by the presence of polysulfids in solution, it is removed by boiling with milk of lime, the precipitated barium sulfite is washed with boiling water to remove any excess of sulfur dioxid or magnesium chlorid that may remain, then dried (unless sold in pulp form) and is ready for the market.

The advantages of this method are: First: The barium sulfite is produced in a pure state at a low manufacturing cost, owing to the use of a large part of the sulfur contained in the roasted ore, and in requiring the use of no sulfuric, or other acid nor salt of any acid, nor the formation of any by-product to be disposed of, at a possibly unfavorable market. Second: The barium sulfite is produced as a fine amorphous white powder, readily broken down with oil by the introduction of magnesium sulfite in small quantities, or as it would be if in a dilute solution. Third: The barium sulfite is produced as a fine amorphous white powder of uniform grain and density by precipitating in hot solutions. Precipitating in cold or lukewarm solutions produces an inferior product difficult to hold on the filter and entailing great waste of the product. Fourth: The use of magnesium chlorid enables me to recover nearly all of the sulfur present in the original ore, as sulfureted hydrogen available for the formation of sulfur dioxid for precipitation, and thus prevents the escape of the various fumes of sulfureted hydrogen to poison workmen or create a nuisance in the vicinity. Fifth: The method of crystallizing out the hydrate and sulfhydrate of barium avoids the constant increase of water and the necessity of evaporating same to recover its valuable constituent, the magnesium chlorid, and at the same time tends to maintain the purity of the product by keeping any soluble impurities that may be in the roasted ore, in the mother liquor until they accumulate in sufficient quantities to be troublesome, when they can be removed. Sixth: The use of magnesium chlorid prevents any strong caustic being carried into the pigment, which would be the case were potassium or sodium sulfites used to precipitate the barium hydrate and sulfhydrate, and as all sulfids of the alkalies or the alkaline earths are unstable, there would be a tendency for the sulfid content to unite with white lead if the barium sulfite were mixed with it or painted over it.

I claim:

1. The herein described process of making barium sulfite, which consists in taking a mixture of barium sulfate and carbonaceous material and placing it in a suitable reduction furnace, applying heat to said mixture to decompose said barium sulfate, applying water to said roasted product so as to convert it into a solution, applying to said solution magnesium chlorid, applying heat to said solution to drive off the hydrogen sulfid, and treating said solution while in a heated condition with sulfur dioxid gas.

2. The herein described process of making barium sulfite, which consists in taking a mixture of barium sulfate and carbonaceous material and placing it in a suitable reduction furnace, applying heat to said mixture to decompose said barium sulfate, applying water to said roasted product so as to convert it into a solution, applying to said solution magnesium chlorid, applying heat to said solution to drive off the hydrogen sulfid, treating said solution while hot with sulfur dioxid gas, and filtering off the magnesium chlorid.

3. The herein described process of making barium sulfite, which consists in taking a mixture of barium sulfate and carbonaceous material and placing it in a suitable reduction furnace, applying heat to said mixture to decompose said barium sulfate, applying water to said roasted product so as to convert it into a solution, applying to said solution magnesium chlorid, applying heat to said solution to the boiling point to drive off the hydrogen sulfid, treating said boiling solution of barium chlorid and magnesium oxid with sulfur dioxid gas, filtering off the magnesium chlorid, and washing the precipitated barium sulfite.

4. The herein described process of making barium sulfite, which consists in taking a mixture of barium sulfate and carbonaceous material and placing it in a suitable reduction furnace, applying heat to said mixture to decompose said barium sulfate, applying water to said roasted product so as to convert it into a solution, boiling said solution, applying to said solution magnesium chlorid, applying heat to said solution to drive off the hydrogen sulfid, and treating said solution while hot with sulfur dioxid gas.

5. The herein described process of making barium sulfite, which consists in taking a mixture of barium sulfate and carbonaceous material and placing it in a suitable reduction furnace, applying heat to said mixture to decompose said barium sulfate, applying water to said roasted product so as to convert it into a solution, boiling said solution, cooling said solution for crystallizing out the barium salts, withdrawing the liquid part of said solution, applying to the crystallized barium salts a solution of magnesium chlorid, applying heat to said solution of crystallized barium salts and the magnesium chlorid solution to drive off the hydrogen sulfid and then treating said solution while hot with sulfur dioxid gas.

6. A step in the process of making barium sulfite, which consists in adding to a solution of barium sulfid a solution of magnesium chlorid, applying heat to said solution of barium sulfid and magnesium chlorid to drive off the hydrogen sulfid, and then charging said solution while hot with sulfur dioxid gas, the application of heat being employed to give increased staining power to the precipitate.

In testimony whereof, I have signed my name to this specification, in presence of two subscribing witnesses.

LE ROY BAKER.

Witnesses:
  H. G. FLETCHER,
  E. L. WALLACE.